(12) United States Patent
Memos

(10) Patent No.: US 6,693,995 B1
(45) Date of Patent: Feb. 17, 2004

(54) PERSONAL CALLER I. D.

(76) Inventor: George Memos, 5935 Liebig Ave., Riverdale, NY (US) 10471

(*) Notice: Subject to any disclaimer, the term of this patent is extended or adjusted under 35 U.S.C. 154(b) by 0 days.

(21) Appl. No.: 09/246,177

(22) Filed: Feb. 4, 1999

Related U.S. Application Data

(60) Provisional application No. 60/088,345, filed on Jun. 8, 1998.

(51) Int. Cl.$^7$ .................................................. H04M 1/64
(52) U.S. Cl. ................ 379/88.19; 379/88.2; 379/88.11; 379/88.09; 379/67.1; 379/88.22; 379/88.23; 379/142.01
(58) Field of Search ................................ 379/142, 373, 379/252, 67.1, 88.2, 88.19, 88.21, 88.09, 142.01, 142.03, 142.04, 142.06, 142.17

(56) References Cited

U.S. PATENT DOCUMENTS

| | | | | |
|---|---|---|---|---|
| 3,810,316 A | * | 5/1974 | Lahlou ....................... | 379/67.1 |
| 3,935,390 A | * | 1/1976 | Winterhalter ............... | 379/67.1 |
| 4,079,200 A | * | 3/1978 | Meri .......................... | 379/67.1 |
| 4,995,075 A | * | 2/1991 | Angiolillo-Bent et al. .. | 379/142 |
| 5,265,145 A | * | 11/1993 | Lim ............................ | 379/142 |
| 5,276,731 A | * | 1/1994 | Arbel et al. ................. | 379/142 |
| 5,349,638 A | | 9/1994 | Pitroda et al. | |
| 5,394,445 A | * | 2/1995 | Ball et al. ................... | 379/142 |
| 5,400,393 A | * | 3/1995 | Knuth et al. ................ | 379/210 |
| 5,432,844 A | * | 7/1995 | Core et al. .................. | 379/374 |
| 5,481,594 A | * | 1/1996 | Shen et al. .................. | 379/142 |
| 5,490,205 A | * | 2/1996 | Kondo et al. ............... | 379/142 |
| 5,559,860 A | * | 9/1996 | Mizikovsky ................. | 379/142 |
| 5,602,908 A | * | 2/1997 | Fan ............................. | 379/142 |
| 5,604,791 A | * | 2/1997 | Lee ............................. | 379/142 |
| 5,778,053 A | * | 7/1998 | Skarbo et al. ............... | 379/93.21 |
| 5,822,416 A | * | 10/1998 | Goodacre et al. ........... | 379/142 |
| 5,881,134 A | * | 3/1999 | Foster et al. ................ | 379/216 |
| 5,963,626 A | * | 10/1999 | Nabkel ........................ | 379/142 |
| 5,978,451 A | | 11/1999 | Swan et al. | |
| 5,995,603 A | * | 11/1999 | Anderson .................... | 379/142 |
| 6,067,348 A | * | 5/2000 | Hibbeler ..................... | 379/88.16 |
| 6,266,399 B1 | * | 7/2001 | Weller et al. ............... | 379/88.19 |

* cited by examiner

*Primary Examiner*—Rexford Barnie
(74) *Attorney, Agent, or Firm*—Lerner, David, Littenberg, Krumholz & Mentlik, LLP

(57) ABSTRACT

This invention can state a Client's question or request for information, answer the question and give the requested information and get a response on the question answered and a response on the information given all in one call and all of it is done on tape. The Professional has recorded a tape which lasts 3 minutes and has 3 sections each lasting one minute. When the Client calls the number is registered on the Caller I D and is decoded. When decoded it plays the section on the tape set aside for the Client. Section one will restate the question or request the Client wants answered. Section two will give the answer to the question or request stated in section one. In section three the Client has the opportunity to respond to the information given in section two after the Client hears, "Please record your response after the beep." After the Client calls the button on the left of the Client's name lights up. When the Professional wants to hear the call he or she presses the lighted button. The call can either be deleted or saved by recording it on the tape set aside for "Recording Messages for Storage." In Distinctive Ringing each regular caller is identified by a musical sound or the speaking out the caller's name at the beginning of the tape set aside for each regular caller. This identifying sound lasts 4 seconds and it is not heard by the caller. Distinctive Ringing in my invention is used only with residential telephones.

18 Claims, 3 Drawing Sheets

FIG. 2

| DOE, JOHN | TELEPHONE NO. 645 9354 | METER NO. 2 TAPE NO. 1 |

JUNE 5, 1999

CALL WAS ABOUT---------                                    500-600

JUNE 10, 1999

CALL WAS ABOUT                                              1500-1600

FIG. 3

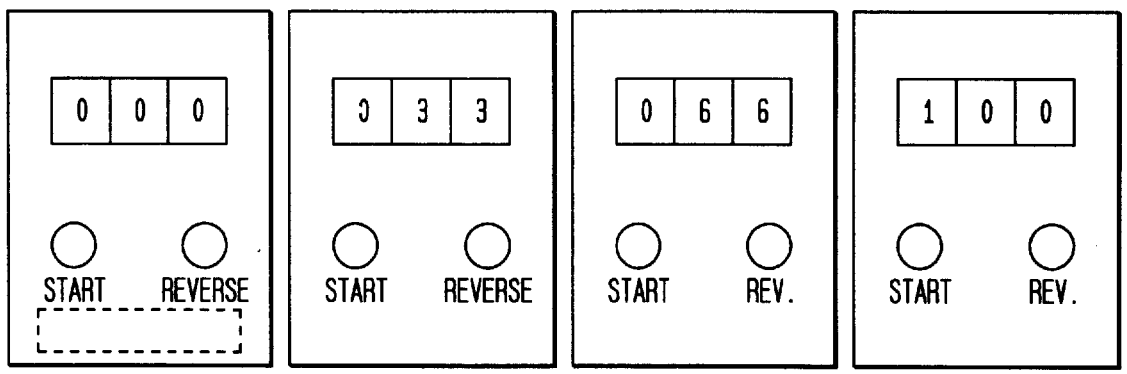

Figure 1:
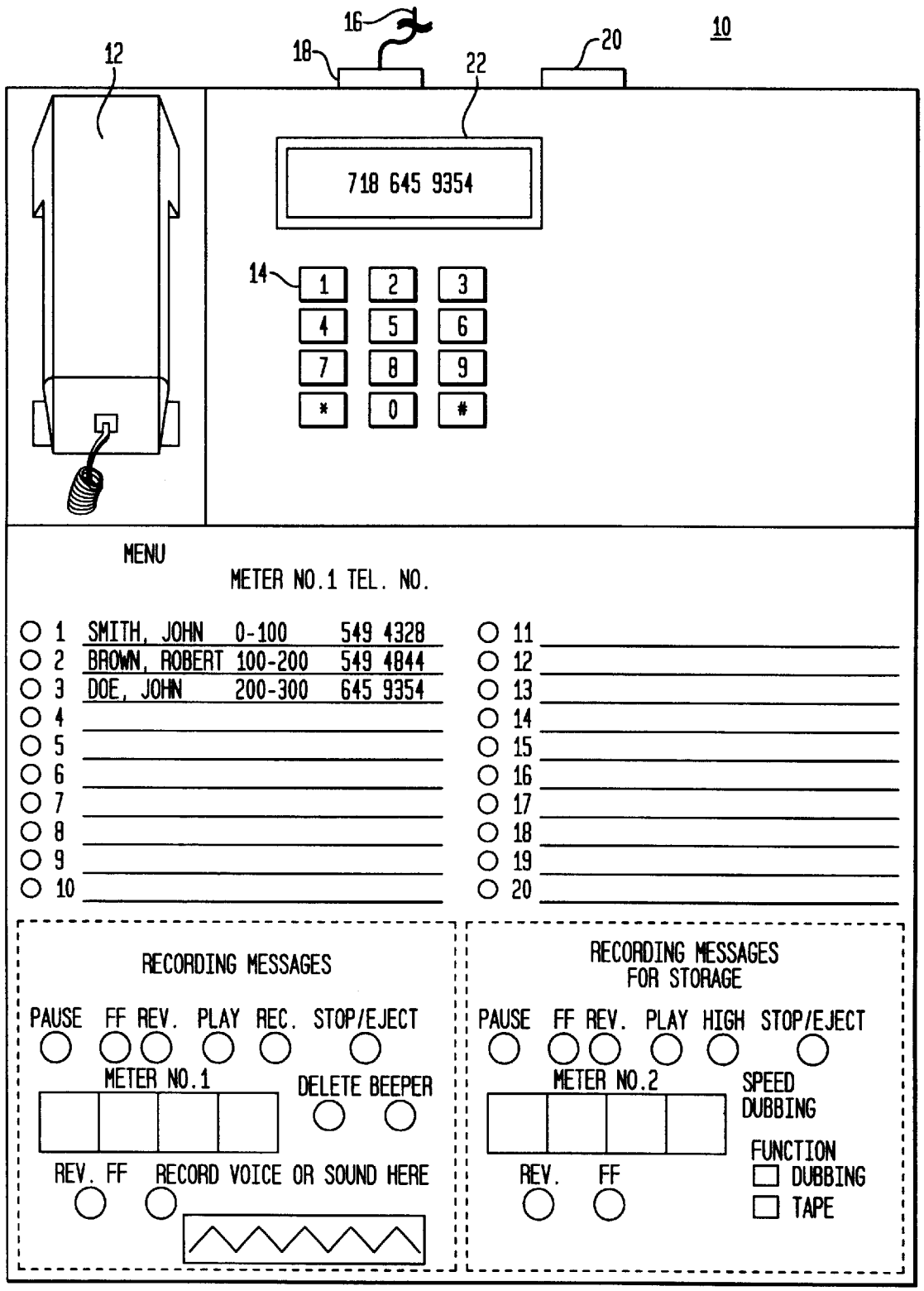

PRESS START AT BEGINNING OF CLIENT'S CALL.

END OF FIRST SECTION. CLIENT'S QUESTION OR REQUEST STATED. LASTS ONE MINUTE.

END OF SECOND SECTION. PROF.'S ANSWER TO CLIENT'S QUESTION OR REQUEST. LASTS ONE MINUTE.

END OF THIRD SECTION CLIENT'S RESPONSE TO INFORMATION GIVEN IN THE SECOND SECTION

PERSONAL CALLER I. D.

CROSS REFERENCE TO RELATED APPLICATIONS

This application claims the benefits of U.S. Provisional Patent Application No. 60/088,345, filed Jun. 8, 1998, entitled PERSONAL CALLER I.D., the entire disclosure of which is hereby incorporated by reference.

STATEMENT REGARDING FEDERALLY SPONSORED RESEARCH OR DEVELOPMENT

"Not applicable"

REFERENCE TO A MICROFICHE APPENDIX

"Not applicable"

BACKGROUND OF THE INVENTION

1. Field of the invention

The invention relates to the outputting of messages with the added benefit of receiving a response. In residential telephones there is an added feature of distinctive ringing.

2. Description of Prior Art

I will deal with outputting of messages and after that the distinctive ringing phase.

Shen (U.S. Pat. No. 5,481,594), "plays back the corresponding audio message from the storage through the audio output." This of course is predetermined. Arbel et al (U.S. Pat. No. 5,276,731) delivers predetermined messages to predetermined calling parties. If it is decided in advance it does not allow for a definite message with a definite answer. Goodacre (U.S. Pat. No. 5.822.416) sends a specific predetermined message to a called party based on Caller I.D. Mitzikovsky (U.S. Pat. No. 5,559,860) also deals with pre-programed responses. Ball et al (U.S. Pat. No. 5,394,445) has outputting messages to a calling party based on the incoming calls caller I D but I find it deficient because it is also complicated and predetermined and too "intuitive" to be very sound.

In distinctive ringing, I feel, the situation is in a primitive state.

Distinctive ringing in Rondo (U.S. Pat. No. 5,490,205) is limited because how many distictive rings can be generated and remembered.

Shen (U.S. Pat. No. 5,481,594) has speech generators that typically have poor sound quality or are relatively expensive.

Angiollo-Bent et al (U.S. Pat. No. 4,995,075) has a prefix and suffix segments etc., that, I feel, would be difficult for a busy professional to remember.

Core et al.(U.S. Pat. No. 5,432,644) does teach an answering apparatus the capability of generating distinctive ringing (abstract). Core's distinctive ringing doesn't give a definite identifying sound and in the work-place individuals have more important things on their mind than to remember tone codes. In my invention there is a direct name one hears or a musical sound that is identified with a definite individual.

Core (110 of FIG. 2) does record the caller's incoming message by first playing an outgoing message. There doesn't appear to be a connection between the incoming message and the outgoing message. In my invention this connection is crucial, My invention can state a Client's question or request for information, answer the question and give the requested information and get a response on the question answered and a response on the information given all in one call and all of it is done on tape that may be recorded and stored on tape.

As of the present, this telephone art is not available. When I talked to a lawyer (employed by a major Tele-Communications Company) dealing with intellectual properties and explained what my invention can do he replied, "I wish I had such a telephone on my desk right now."

BRIEF SUMMARY OF THE INVENTION

The Prof. (professional) and Client had a prima face meeting or a first telephone call. The Client asks the Prof. to look up some information. The Prof. tells the Client that a Personal Caller I D will be used to get the information to the Client. The Client is given or sent a notebook with a pen and a small meter that can be put flat on a desk. When the Client calls the regular Caller I D registers the number and it is decoded. By decoded I mean it is programed to play a section of tape alloted for that number. The Client will hear the question he or she wants answered. It will last one minute. Continuing, the Client will hear the question answered and the information he or she requested. It will last one minute. As the tape continues the third section will be set aside for a response by the Client after the Client hears, "Pleases record your response after the beep." The three sections will each last one minute.

The Client will press start on the meter, that is flat on the desk in front of the Client, at the beginning of the recording. The first section, the question will use up 0 to 33 on the meter. Section two, the answer, will use up 33 to 66 on the meter. Section three, the response, will take up 66 to 100 on the meter.

As it was mentioned above, the Client was asked to work out his or her response in the notebook to have as a record. It will be a time saver for both parties. It will be one minute of a concise and compact response. If the Client wants to hear the call again, he or she can call again. The Client can press reverse on the meter to get to 0 again. The Client may call anytime during the week and all week-end.

The Prof. prepares the tape in the following manner. Each Client will be listed on the Menu (FIG. 1). Each Client will have 100 numbers on the Meter No. 1 (FIG. 1). If the Prof. wants to record a message for Client No. 3, Client No. 3 is assigned 200 to 300 on Meter No. 1 which represents three minutes of playing time on the tape, The whole tape, if it has 60 minutes, can service 20 Clients. After each hundred on the Meter No. 1, 100 for each client, the tape automatically stops, with the aid of a timer.

When the Prof. has his or her work completed he or she may start to record. The Prof. sets Meter No. 1 for Client No. 3 (FIG. 1). Meter No. 1 is set at 200. Now the Prof. is ready to record. Of course, when the tape is recording it is reflected on Meter No. 1. The Prof. presses Record button (FIG. 1) of Recording Messages and talks near the section Record voice or sound here (FIG. 1). The Prof. will record the question and use 200 to 233 on the Meter No. 1. It will last one, minute.

Continuing, the Prof. will answer the question using up 233 to 266 on Meter No. 1. It will last one minute. Then the Prof. will say, "Please record your response after the beep," and the Prof. will press the beeper, (FIG. 1). This section will last one minute. The tape will stop at the end of the response with the aid of a timer. The Meter No. 1 will, of course, have the number 300. The Recording is ready for the Client.

After the Client calls and hears the recording and records his or her response the button on the left side of the Client's name, using a timer, lights up. When the Prof. wants to hear the call the Prof. presses the lighted button and, with the aid of a timer reverses to 200 on Meter No. 1 and plays to 300 on Meter No. 1. If the Prof. wants to save the call he or she presses reverse button of Meter No. 1 to go from 300 to 200. The Prof. then presses play on the "Recording Messages" (FIG. 1) and simultaneously presses High Speed Dubbing on "Recording Messages for Storage" (FIG. 1). The call will be recorded and stored. After the Prof. records the call, he or she will record in his or her notebook (FIG. 2) on the page set aside for that Client, the date the Client called, a note on the call and the numbers used on Meter No. 2. When the Prof. wants to rehear the call he or she will adjust the Meter No. 2 connected to the tape used for the "Recording Messages for Storage" and rehears the call (FIG. 1). Example. If the Prof. wants to rehear John Doe's call of Jun. 10, 1999 (FIG. 2) Meter No. 2 is set at 1500 and the Prof. presses play of the tape, "Recording Messages fo Storage." With the aid of a timer, Meter No. 2 stops at 1600. The call has been heard. The switch, in Function, is set at Dubbing for recording a message and Tape for rehearing a message. (FIG. 1)

Distinctive Ringing in my invention is used only with residential telephones.

When the telephone rings it will ring two times and with the aid of a timer, it will stop. The Caller I D will register the number. It will be decoded, by a decoder, and will play the section of the tape set aside for that number, as stated above on how Personal Caller I D works. The only difference is that the called party has, at the beginning of section one, with the aid of timer, a sound lasting 4 seconds to identify the caller. These sounds can be a musical motive or speaking out the name of the caller. These 4 seconds of sound are not heard by the caller by the use of a sound blocking device.

Someone working at home, I am sure, will appreciate working at length without a disturbance. No one will have to get up at a family supper to answer the phone. They all would know who it is and a recording will satisfy that call. All wrong numbers and all other calls will be left on the answering machine. The individual, finally, has control over his or her time.

BRIEF DESCRIPTIONS OF THE SEVERAL VIEWS OF THE DRAWINGS

FIG. 1 has a view of an illustrative Personal Caller I D Device 10 in accordance with the present invention. No. 12 is the receiver and 14 a numeric keyboard. Device 10 is connected to a standard telephone line 16 via input jack 18. An output jack 20 is provided to the standard telephone line 16 via input jack 18 for attachment of other telephone line equipment. Display 22 displays the caller identification number transmitted with the telephone call through the telephone network that identifies the telephone number from which the calling party is calling. This is done by means of fiber optics in the telephone line that can transmite or receive information. These fiber optics are also used in this invention to decode an incoming telephone number and activate a series of timers and play a section of the Recording messages tape assigned to that number.

The Menu may have 20 (or more) names of clients. On the Menu each client is assigned 100 numbers on Meter No. 1. The telephone numbers of each client may be manually added or taken off the list. This can also be done digitally with information going through a telephone line and then turned into numbers. The Binary Code 01 is used and then decoded into numbers 0 to 10. This is an oversimplification of a Tele-Communication Art that has manifested itself in remarkable works.

Meter No. 1 has 4 digits with a button for Reverse and Fast Forward. The tape for Recording Messages has Pause, Fast Forward, Reverse, Play, Record, Stop/Eject, Delete and Beeper. The short lines - - - indicates where the tape for Recording Messages is located. Recording Messages is used by the Prof. to record his or her messages. The Prof. records or speaks near the Record voice or sound here section. The tape used for Recording Messages fox Storage is indicated by short lines - - - . Meter No. 2 has a button for Reverse and Fast Forward and of course is connected to the tape for Recording Messages for Storage. Buttons for the tape Recording Messages for Storage are Pause, Fast Forward, Reverse. Play, High Speed Dubbing and Stop/Eject. The Recording Messages for Storage tape has a switch for controlling Dubbing and Tape playing. It is used as in a regular tape recorder. When copying a message the switch will be on Dubbing. When rehearing a message the switch will be on Tape.

FIG. 2

FIG. 2 shows the page, in the Prof.'s notebook, for John Doe. Each Client will have a page in the notebook. It will include the Client's name, telephone number and calls recorded. The date the Client called and a notation about the call will also be recorded. When the tape is complete another tape will be placed in its place and will be labeled as Recording Messages for Storage Tape No. 2.

FIG. 3

FIG. 3 shows the meter the Prof. gives or sends to the Client. It shows the meter before the call and the dotted lines indicating where the battery is located.

Figure 4:
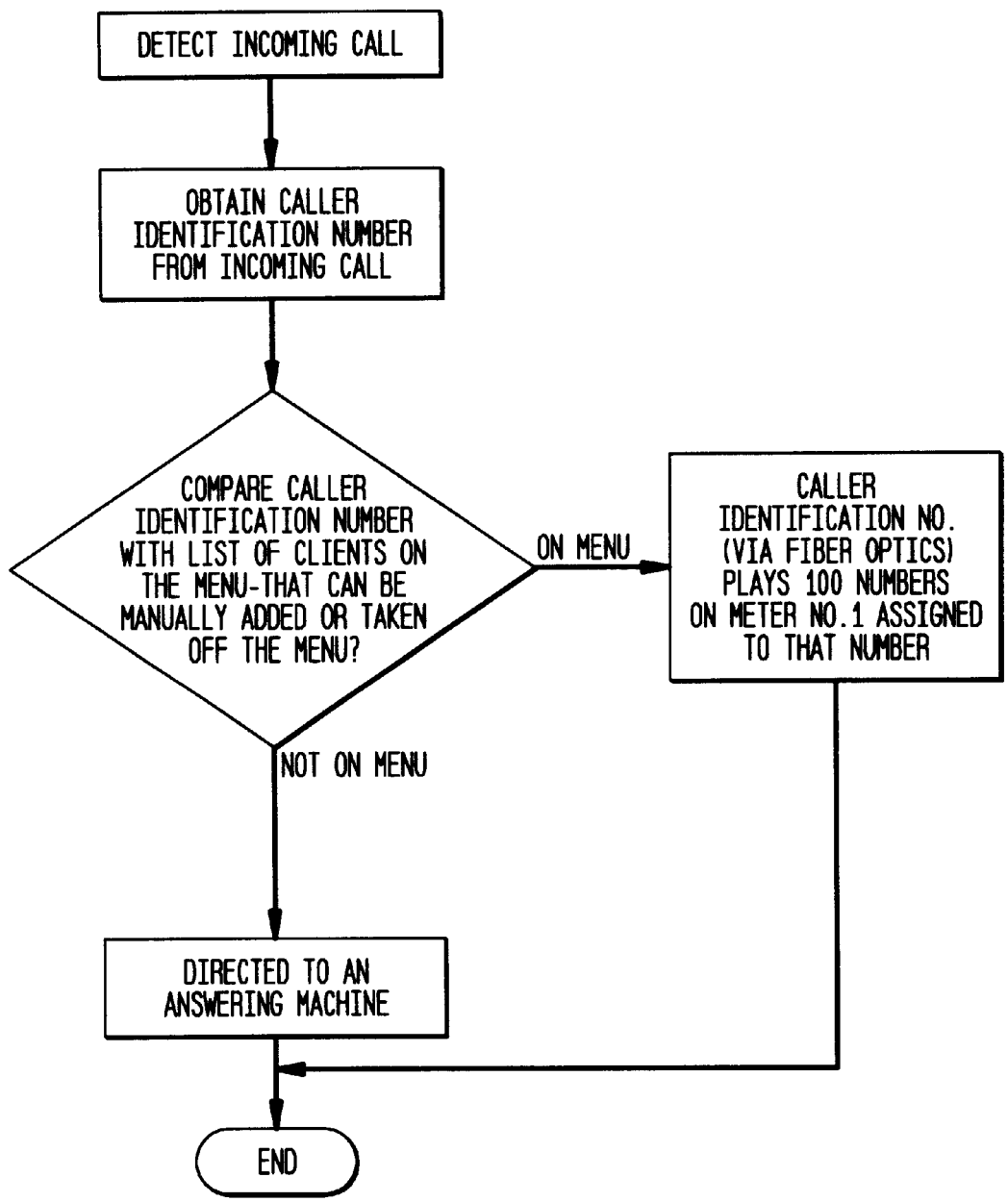

FIG. 4 is a flow chart of the steps involved in the use of the present invention. The telephone rings and the Caller Identification number is displayed on 22 (FIG. 1). The Caller Identification number is compared to the list on the Menu (FIG. 1). If it is not on the Menu the call is directed to an answering machine with the use of output jack 20 (FIG. 1) to the standard telephone line 16 via input jack 18. If the Caller Identification number is on the Menu it is decoded (via fiber optics) and plays 100 numbers on Meter No. 1 assigned to that number. Example. If John Doe calls his number is displayed on 22. It is decoded and via fiber optics plays 200 to 300 on Meter No. 1. It stops with the use of a timer and the light on the left of his name goes on to signal that John Doe called.

The Prof. may add or delete telephone numbers manually from the Menu with a mechanical switch. Today it is possible to program the different operations with a computer. Talking to a technician I found out that all this information can be stored in a chip in the telephone to do all the operations necessary in the present invention. Where ever the technical improvements may lead to the nucleus of the present invention will remain constant. This nucleus is that it can state a Client's question or request for information, answer the question and give the requested information and get a response on the question answered and a response on the information given all in one call and all of it is done on tape that may be recorded and stored on tape.

In a discussion recently with someone who works with technicians he told me, "A chip may be placed in a phone and it can do everything. It is connected to a power source." The power source may be a battery, a telephone line or an electric outlet. A chip and a battery constitutes a complete circuitry.

DETAILED DESCRIPTION OF THE INVENTION

In this invention the Caller I D and the regular telephone is used in an improved manner.

The Prof. (professional) and Client had a prima face meeting or a first telephone call. The Client asks the Prof. to look up some information. The Prof. tells the Client that a Personal Caller I D will be used to get the information to the Client. The Client is given or sent a notebook with a pen and a small meter that can be put flat on the desk. The meter is run by a small battery. It has 3 digits and two buttons, Start and Reverse. (FIG. 3) The Client is told to work out the response in the notebook so it will be concise and easily understood. This material in the notebook will become a record of what the Prof. and the Client are working towards.

When the Client calls the regular Caller I D registers the number and it is decoded. By decoded I mean it is programmed to play a section of tape alloted for that number. This tape is the Recording Messages tape (FIG. 1). The names are listed on the Menu (FIG. 1) with the numbers alloted for each Caller placed after the Caller's name.

The Client will hear the question he or she wants answered. It will last one minute. Continuing, the Client will hear the question answered and the information he or she requested. It will last one minute. As the tape continues the third section will be set aside for a response by the Client after the Client hears, "Please record your response after the beep." The three sections will each last one minute.

The Client will press start on the meter, that is flat on the desk in front of the Client, at the beginning of the recording. The first section, the question will use up 0 to 33 on the meter. Section two, the answer, will use up 33 to 66 on the meter. Section three, the response, will take up 66 to 100 on the meter. Before the Client calls, the Client will have the meter, the notebook with the response ready for the call. As it was mentioned above, the Client was asked to work out his or her response in the notebook to have as a record. When the Client hears, "Please record your response after the beep," he or she will read the prepared response. It will be a time saver for both parties. It will be one minute of a concise and compact response. If the Client wants to hear the call again, he or she can call again. The Client may call anytime during the week and all weekend.

The Prof. will use the Recording Messages tape (FIG. 1) to prepare the messages. The Prof. prepares the messages in the following manner. Each Client will be listed on the Menu (FIG. 1). If the Prof. wants to record a message for Client No. 3, Client No. 3 is assigned 200 to 300 on Meter No. 1 which represents three minutes of playing time on the tape. The whole tape, if it has 60 minutes, can service 20 clients. After each hundred on the Meter No. 1, with the aid of a timer, 100 for each Client, the tape automatically stops.

When the Prof. has his or her work completed he or she may start to record. The Prof. wants to record a message for Client No. 3. First the Prof. sets the Meter No. 1 for Client No. 3 (Meter No. 1 FIG. 1). The Meter No. 1 is set at 200. Now the Prof. is ready to record. Of course, when the tape is running it is reflected on Meter No. 1. The Prof. presses Record button of the Recording Messages tape (FIG. 1) and talks near the section labeled Record voice or sound here (FIG. 1). The Prof. will record the question and use up 200 to 233 on the Meter No. 1 It will last one minute. Continuing, the Prof. will answer the question using up 233 to 266 on the Meter No. 1. It will last one minute. Then the Prof. will say, "Please record your response after the beep," and the Prof. will press the beeper (FIG. 1). This section will last one minute. The tape will stop, with the aid of a timer, at the end of the response. Meter No. 1 will of course, have the number 300. The recording is ready for the Client.

After the Client calls and hears the recording and records his or hers response the button on the left side of the Client's name, with the aid of a timer, lights up. When the Prof wants to hear the call he or she presses the lighted button. If the Prof. does not want to save the call he or she presses delete using the same method as is found, on an answering machine. The call is automatically deleted. If the Prof. wants to save the call he or she presses reverse button of Meter No. 1 to go from 300 to 200. The Prof. then presses play on the Recording Messages tape (FIG. 1) and simultaneously presses High Speed Dubbing on Recording Messages for Storage tape (FIG. 1). The call will be recorded and stored. After the Prof. records the call, he or she will record in his or her notebook (FIG. 2) on the page set aside for that Client, the date the Client called, a note on the call and the numbers used on Meter No. 2. When the Prof. wants to rehear a call he or she will adjust Meter No. 2 connected to the tape used for the Recording Messages for Storage and rehears the call (FIG. 1), Example. If the Prof. wants to rehear John Doe's call of Jun. 10, 1999 (FIG. 2) Meter No. 2 is set at 1500 and the Prof. presses play of the tape Recording Messages for Storage, and with the aid of a timer, Meter No. 2 stops at 1600. The call has been heard. when the tape is completed another tape will take its place and will be labeled Recording Messages for Storage tape No. 2.

The time limit can be adjusted depending on the needs of the Prof, Meter No. 1 may be adjusted and the 100 numbers for each client will remain the same. Meter No. 2 will also be adjusted to have 100 numbers for each call recorded and stored on the Recording Messages for Storage tape. The switch, in function is set at Dubbing for recording a message and Tape for rehearing a message. (FIG. 1)

Distinctive Ringing in my invention is used only with residential telephones.

When the telephone rings it will ring two times and with the aid of a timer, it will stop. The Caller I D will register the number. It will be decoded, by a decoder, and will play the section of the tape set aside for that number, as stated in my Summary above on how Personal Caller I D works. The only difference is that the called party has, at the beginning of section one, with the aid of a timer, a sound lasting 4 seconds to identify the caller. These sounds can be a musical motive or speaking out the name of the caller. These 4 seconds of sound are not heard by the caller. There are many well known compositions that start with a few notes (called a motive) that are easily recognized. Records and tapes are available that have different sound effects. With the aid of a sound blocking device, the caller will not hear the 4 seconds of the identifyig sound.

Someone working at home, I am sure, will appreciate working at lenght without a disturbance. No one will have to get up at a family supper to answer the phone. They all would know who it is and a recording will satisfy that call. All wrong numbers and all other calls will be left on the answering machine. The individual, finally, has control over his or her time.

What I claim as my invention is:

1. A method of processing a set of messages, the method comprising:

(a) preparing a question by a specific client;

(b) identifying the question to a user;

(c) recording an outgoing message by the user for the specific client, the outgoing message including the question prepared by the specific client and a response to the question, the outgoing message being recorded in a first memory;

(d) determining timing information;

(e) providing a client meter having the timing information to the specific client;

(f) receiving an incoming call from a calling party;

(g) comparing calling party information of the incoming call to a client list;

(h) playing the outgoing message to the calling party if the calling party information matches to the specific client in the client list; and (i) recording an incoming message from the calling party in the first memory, the calling party using the timing information to facilitate recording the incoming message, wherein the incoming message is associated with the outgoing message so that a user can retrieve the outgoing message and the incoming message as a unit.

2. The method of claim 1, further including:
directing the incoming call to an answering machine if the calling party information does not match to any specific client in the client list.

3. The method of claim 1, further including:
replaying at least a portion of the incoming message.

4. The method of claim 3, further including:
storing the at least a portion of the incoming message in a second memory.

5. The method of claim 4, further including:
storing at least a portion of the outgoing message in the second memory, wherein the at least a portion of the outgoing message is associated with the at least a portion of the incoming message.

6. The method of claim 1, further including:
associating the incoming message with the timing information of the outgoing message.

7. The method of claim 1, wherein the first memory is a tape.

8. A system for processing a set of messages between a called party and a calling party, the system comprising:
a messaging apparatus, the messaging apparatus including:
 (a) a first memory for recording messages,
 (b) a recorder for recording an outgoing message for a specific client, the recorder recording the outgoing message in a first memory,
 (c) an input for receiving an incoming call from the calling party,
 (d) a comparator for comparing calling party information of the incoming call to a client list, and
 (e) a player for playing the outgoing message to the calling party if the calling party information matches to the specific client in the client list, wherein the recorder is operable to record an incoming message from calling party in the first memory after the outgoing message is played, the incoming message being associated with the outgoing message in the first memory; and
a client meter stationed at the calling party's location, the client meter operable to supply timing information to the calling party, thereby facilitating recording the incoming message from the calling party, wherein the timing information is determined by the called party, and the called party provides the client meter to the calling party.

9. The system of claim 8, further including:
an output in the messaging apparatus, the output operable to redirect the incoming call to an answering machine if the calling party information does not match to any specific client in the client list.

10. The system of claim 8, wherein the outgoing message includes a question and a response, the response providing an answer to the question, and wherein the question is based upon information previously provided by the specific client who is the calling party.

11. The system of claim 8, the messaging apparatus further including a second memory, wherein the second memory is operable to store at least a portion of the incoming message.

12. The apparatus of claim 11, wherein the second memory is further operable to store at least a portion of the outgoing message, the at least a portion of the outgoing message being associated with the at least a portion of the incoming message.

13. The system of claim 8, wherein the timing information is associated with the outgoing message.

14. A method of processing a set of messages between a user and a specific client, the method comprising:
 (a) the user obtaining a question posed by the specific client during a discussion with the specific client;
 (b) the user preparing a response to the question;
 (c) determining timing information;
 (d) providing a client meter having the timing information to the specific client;
 (e) recording the outgoing message for the specific client in a first memory, the outgoing message including the question and the response;
 (f) receiving an incoming call from a calling party;
 (g) comparing calling party information of the incoming call to a client list;
 (h) playing the outgoing message to the calling party if the calling party information matches to the specific client in the client list; and
 (i) recording an incoming message from the calling party in the first memory, the calling party using the timing information to facilitate recording the incoming message, the incoming message being associated with the outgoing message in the first memory, the incoming message being a reply to the outgoing message, wherein the user can retrieve the outgoing message and the incoming message together.

15. The method of claim 14, wherein the incoming message and the outgoing message are stored as a unit in a second memory, the second memory operable to be retrieved at any time.

16. The method of claim 14, wherein the first memory is a tape.

17. The method of claim 7, wherein the tape includes one or more segments for different calling parties, each of the segments including a first portion for a question, a second portion for a response, and a third portion for a reply.

18. A method of processing a set of messages, the method comprising:
 (a) a user recording an outgoing message for a specific client in a first memory, the outgoing message including a question and a response, the response providing an answer to the question and the question being previously provided by the specific client to the user;
 (b) determining timing information;
 (c) providing a client meter having the timing information to the specific client;
 (d) receiving an incoming call from a calling party;
 (e) comparing calling party information of the incoming call to a client list;
 (f) playing the outgoing message to the calling party if the calling party information matches to the specific client in the client list; and
 (g) recording an incoming message from the calling party in the first memory, the calling party using the timing information to facilitate recording the incoming message, wherein the incoming message is associated with the outgoing message.

* * * * *

UNITED STATES PATENT AND TRADEMARK OFFICE
CERTIFICATE OF CORRECTION

PATENT NO. : 6,693,995 B1
APPLICATION NO. : 09/246177
DATED : February 17, 2004
INVENTOR(S) : George Memos It is certified that error appears in the above-identified patent and that said Letters Patent is hereby corrected as shown below:

Column 1, line 44, "Rondo" should read --Kondo--.
Column 1, line 45, after "because" insert --,--.
Column 1, line 54, replace "5,432,644" with --5,432,844--.
Column 2, line 57, delete ",".
Column 4, line 10, replace "fox" with --for--.
Column 6, line 19, replace "Prof," with --Prof.--.

Signed and Sealed this

Twelfth Day of September, 2006

JON W. DUDAS
*Director of the United States Patent and Trademark Office*